Geo. Peacock.
Moldboard for Plows.

No. 118,551.  Patented Aug. 29, 1871.

Witnesses:  Inventor:
Geo. Peacock.
Per
Attorneys.

UNITED STATES PATENT OFFICE.

GEORGE PEACOCK, OF SELMA, ALABAMA.

IMPROVEMENT IN MOLD-BOARDS FOR PLOWS.

Specification forming part of Letters Patent No. 118,551, dated August 29, 1871.

*To all whom it may concern:*

Be it known that I, GEORGE PEACOCK, of Selma, in the county of Dallas and State of Alabama, have invented a new and Improved Mold-Board for Plows; and I do hereby declare the following to be a full, clear, and exact description of the same, reference being had to the accompanying drawing making a part of this specification, in which—

Figure 1:
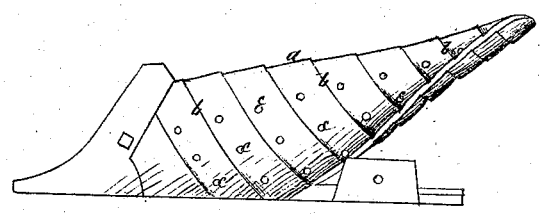
Figure 2:
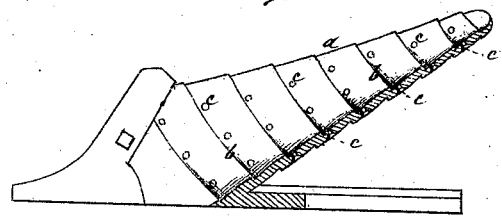

Figure 1 is a side elevation, and Fig. 2 is a longitudinal section.

This invention has for its object to prevent soil from adhering to the mold-boards of plows as they are drawn through it, and thus increasing their resistance to the draft-animals and necessitating frequent halts to enable the mold-boards to be cleaned off. This difficulty is especially liable to occur in stiff clayey soils, and renders necessary the use of wooden mold-boards, which do not clog as readily as metal ones, but which speedily wear out, requiring, therefore, to be frequently renewed. Supposing the cause of the adhering of soil to mold-boards to be the formation of vacuums between the earth and the clay by the great pressure of the one upon the other, I have devised a mold-board having a corrugated, grooved, or ribbed exterior surface, and having, also, orifices made through it for the purpose of preventing the formation of such vacuums.

Referring to the drawing, $a$ is a mold-board, $b$ are the corrugations or ribs on the outside thereof, and $c$ the perforations made through it. These ribs and perforations, by preventing the soil from pressing close to the whole surface of the mold-board and by giving air access to the earth at the surface of the mold-board, render the occurrence of a vacuum at that point impossible, and, consequently, prevent the soil from adhering to the plow.

Having thus described my invention, what I claim as new, and desire to secure by Letters Patent, is—

A mold-board for plows, corrugated and perforated, substantially as herein shown and described, for the purpose specified.

GEORGE PEACOCK.

Witnesses:
W. C. WARD,
Z. H. BOWLES.